US010643404B2

(12) United States Patent
Moghe et al.

(10) Patent No.: US 10,643,404 B2
(45) Date of Patent: May 5, 2020

(54) INTERFACING A VEHICLE WITH A FOG DEVICE DURING FUELING

(71) Applicant: Cisco Technology, Inc., San Jose, CA (US)

(72) Inventors: Ashok Krishnaji Moghe, Pleasanton, CA (US); David A. Maluf, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 15/498,095

(22) Filed: Apr. 26, 2017

(65) Prior Publication Data
US 2018/0315258 A1 Nov. 1, 2018

(51) Int. Cl.
| | |
|---|---|
| G07C 5/08 | (2006.01) |
| G07C 5/00 | (2006.01) |
| B67D 7/38 | (2010.01) |
| H04L 29/08 | (2006.01) |
| H04W 4/00 | (2018.01) |
| H04W 76/14 | (2018.01) |
| H04W 4/80 | (2018.01) |

(Continued)

(52) U.S. Cl.
CPC ............ *G07C 5/0808* (2013.01); *B60L 53/60* (2019.02); *B67D 7/38* (2013.01); *G07C 5/008* (2013.01); *H04L 67/12* (2013.01); *H04W 4/80* (2018.02); *H04W 76/14* (2018.02); *B67D 7/04* (2013.01); *H04W 84/005* (2013.01); *H04W 84/12* (2013.01); *H04W 88/16* (2013.01)

(58) Field of Classification Search
CPC ....... G07C 5/0808; G07C 5/008; B60L 53/18; B60L 53/60; B60L 53/14; H04W 4/80; H04W 76/14; H04W 84/005; H04W 84/12; H04W 88/16; H04L 67/12; B67D 7/38; B67D 7/04
See application file for complete search history.

(56) References Cited

U.S. PATENT DOCUMENTS

| | | | | |
|---|---|---|---|---|
| 2004/0019577 | A1* | 1/2004 | Abdel-Malek | ........... B61K 9/00 |
| 2013/0029595 | A1* | 1/2013 | Widmer | ............... H04B 5/0031 |
| | | | | 455/39 |

FOREIGN PATENT DOCUMENTS

| | | |
|---|---|---|
| CN | 104300646 A | 1/2015 |
| CN | 105186631 A | 12/2015 |
| WO | WO-2012078921 A2 | 6/2012 |

OTHER PUBLICATIONS

"Delphi Connect", http://www.delphiconnect.com/?option=1, Accessed Dec. 9, 2016, Delphi.

(Continued)

*Primary Examiner* — Nga X Nguyen
(74) *Attorney, Agent, or Firm* — Behmke Innovation Group LLC; James M. Behmke; James J. Wong

(57) ABSTRACT

In one embodiment, a fog computing-based fueling kiosk forms a fueling connection with a vehicle and a direct network connection between the kiosk and a gateway for a network of the vehicle. The fueling kiosk provides energy to the vehicle via the fueling connection and receives, via the network connection with the gateway for the network of the vehicle, operational data from the network of the vehicle, while providing the energy to the vehicle via the fueling connection. The fueling kiosk performs an analysis of the received operational data from the vehicle and provides a result of the performed analysis to a remote device.

20 Claims, 9 Drawing Sheets

(51) Int. Cl.
*B60L 53/60* (2019.01)
*H04W 88/16* (2009.01)
*H04W 84/12* (2009.01)
*B67D 7/04* (2010.01)
*H04W 84/00* (2009.01)

(56) References Cited

OTHER PUBLICATIONS

"Electric Vehicle Charging Infrastructure", http://www.mpoweruk. com/infrastructure.htm#top, Electropaedia, Mpoweruk.com, 7 pages, Accessed Dec. 20, 2016, Woodbank Communications Ltd.
"Hum Features: Emergency Vehicle Assistance", https://www.hum. com/features, Hum by Verizon, Accessed Dec. 9, 2016. Verizon.

* cited by examiner

INTERFACING A VEHICLE WITH A FOG DEVICE DURING FUELING

TECHNICAL FIELD

The present disclosure relates generally to computer networks, and, more particularly, to interfacing a vehicle with a fog device during fueling.

BACKGROUND

In recent years, the amount and type of data collected by cloud-based services and data centers from edge devices has been increasing significantly. This is particularly true in the case of edge devices such as passenger and commercial vehicles. For example, a vehicle of the future may produce multiple terabytes (TBs) of data per day. However, many existing gateways do not support the size requirements of this additional data. Notably, a typical mobile gateway for a vehicle operates over a cellular connection (e.g., LTE) at a speed range in the lower Megabits. For example, consider a Lidar sensor in a vehicle that produces over 2 TB of data per day. In such a case, it would be impractical to transmit this data over an existing cellular connection of the vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
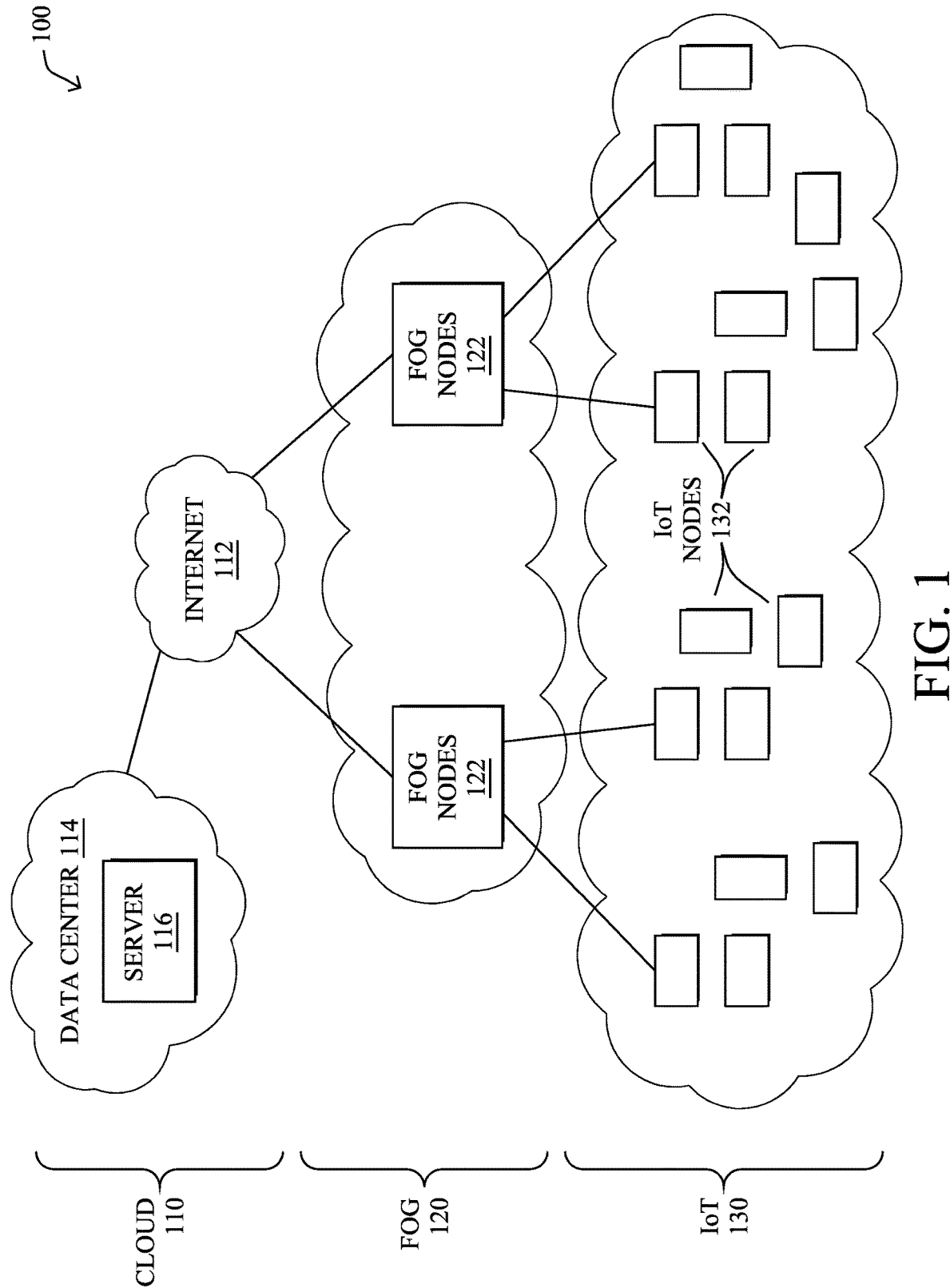
FIG. 1 illustrate an example communication network.

According to one or more embodiments of the disclosure, a fog computing-based fueling kiosk forms a fueling connection with a vehicle and a direct network connection between the kiosk and a gateway for a network of the vehicle. The fueling kiosk provides energy to the vehicle via the fueling connection and receives, via the network connection with the gateway for the network of the vehicle, operational data from the network of the vehicle, while providing the energy to the vehicle via the fueling connection. The fueling kiosk performs an analysis of the received operational data from the vehicle and provides a result of the performed analysis to a remote device.

According to further embodiments, a vehicle having a network forms a fueling connection and a direct network connection with a fog computing-based kiosk. The direct network connection connects the network of the vehicle with the kiosk via a gateway of the vehicle. The vehicle receives energy from the fueling kiosk via the fueling connection. The vehicle provides, via the network connection, operational data from the network of the vehicle, while receiving the energy from the kiosk via the fueling connection. The kiosk performs an analysis of the operational data and provides a result of the analysis to a remote device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration. Fiber optical connections, as described above are often used to interconnect the distributed fog nodes.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
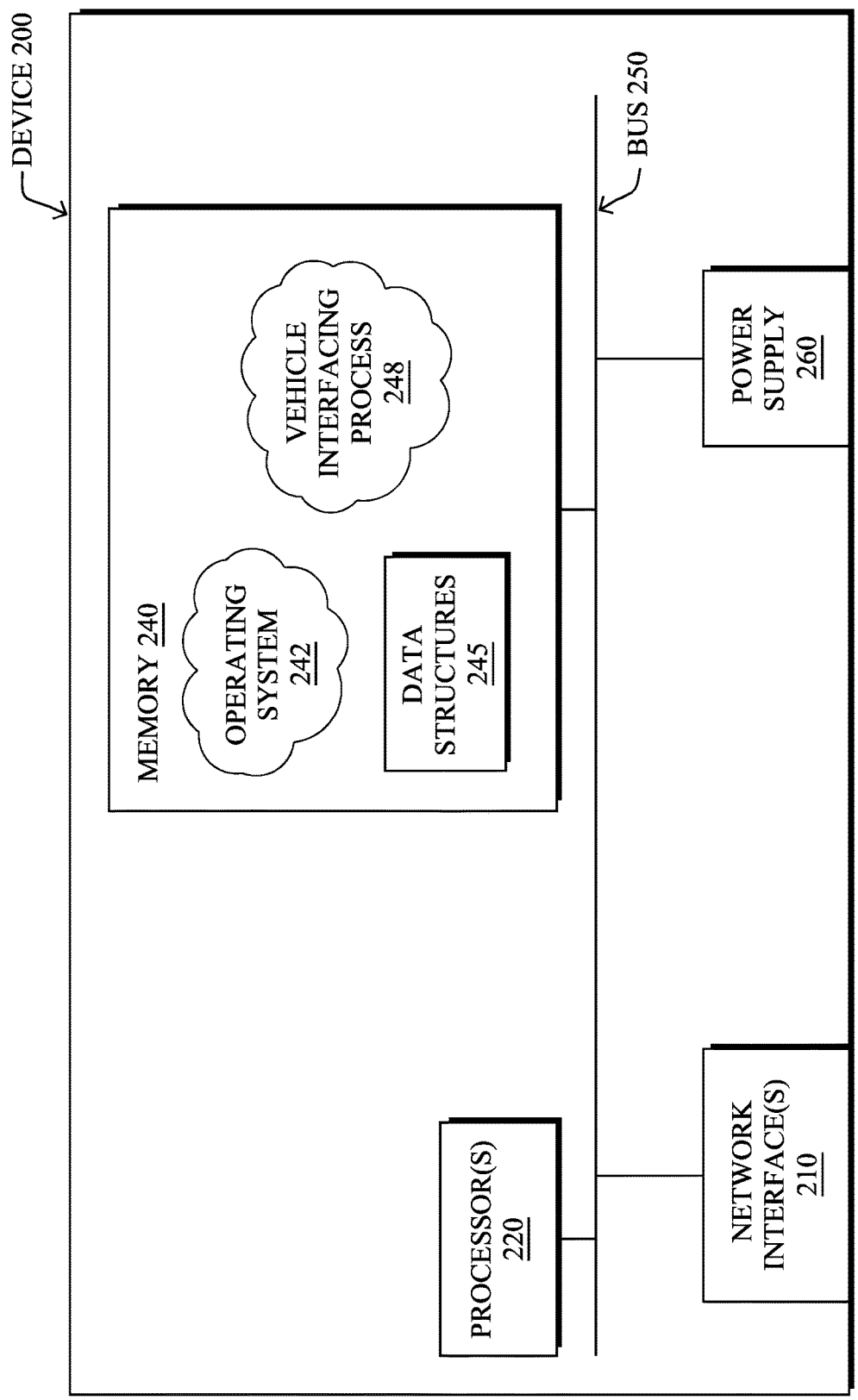
FIG. 2 illustrates an example network device/node.

FIG. 2 is a schematic block diagram of an example computing device/node 200 that may be used with one or more embodiments described herein e.g., as part of a smart fueling kiosk or vehicle network described herein. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, PLC communications, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative vehicle interfacing process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Serial networks are another type of network, different from an internet protocol (IP) network, typically forming a localized network in a given environment, such as for automotive or vehicular networks, industrial networks, entertainment system networks, and so on. For example, those skilled in the art will be familiar with the on-board diagnostics (OBD) protocol (a serial network which supports a vehicle's self-diagnostic and reporting capability, including the upgraded "OBD II" protocol), the controller area network (CAN) bus (or CAN BUS) protocol (a message-based protocol to allow microcontrollers and devices to communicate with each other in applications without a host computer), and the MODBUS protocol (a serial communications protocol for use with programmable logic controllers, such as for remote terminal units (RTUs) in supervisory control and data acquisition (SCADA) systems). Unlike an IP-based network, which uses a shared and open addressing scheme, a serial communication network generally is based on localized and proprietary communication standards, where commands or data are transmitted based on localized device identifiers, such as parameter identifiers (PIDs), localized station addresses, and so on.

Figure 3A:
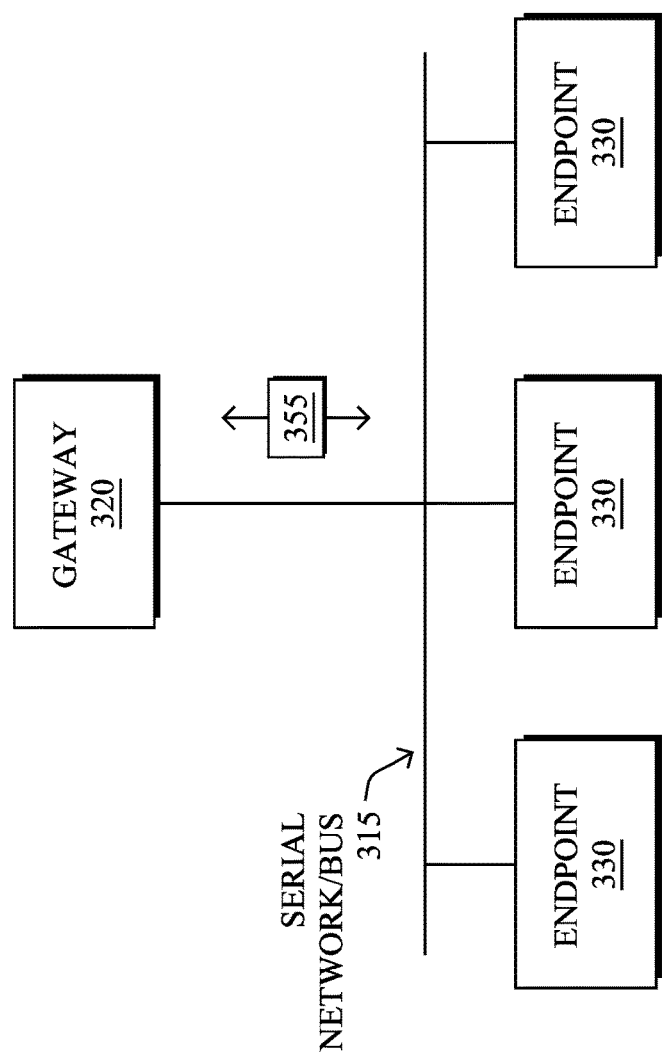
FIGS. 3A-3B illustrate an example vehicle serial communication system.

FIG. 3A illustrates an example communication system 300 illustratively comprising a serial network/bus 315, along with a gateway (or other network device) 320 interconnecting the serial network/bus 315 with one or more other external networks. Serial network 315, in particular, illustratively comprises one or more endpoints 330 (e.g., a set of one or more controlled devices, sensors, actuators, controllers, processors, and so on), such as part of a vehicular network, an industrial network, etc. The endpoints may be interconnected by various methods of serial communication. For instance, the serial network/bus 315 may allow the endpoints 330 to communicate serial data 355 (e.g., commands, sensor data, etc.) using predefined serial network communication protocols (e.g., OBD, CAN Bus, MODBUS, etc.). In this context, a serial network protocol consists of a set of rules defining how the endpoints interact within the serial network 315.

Figure 3B:
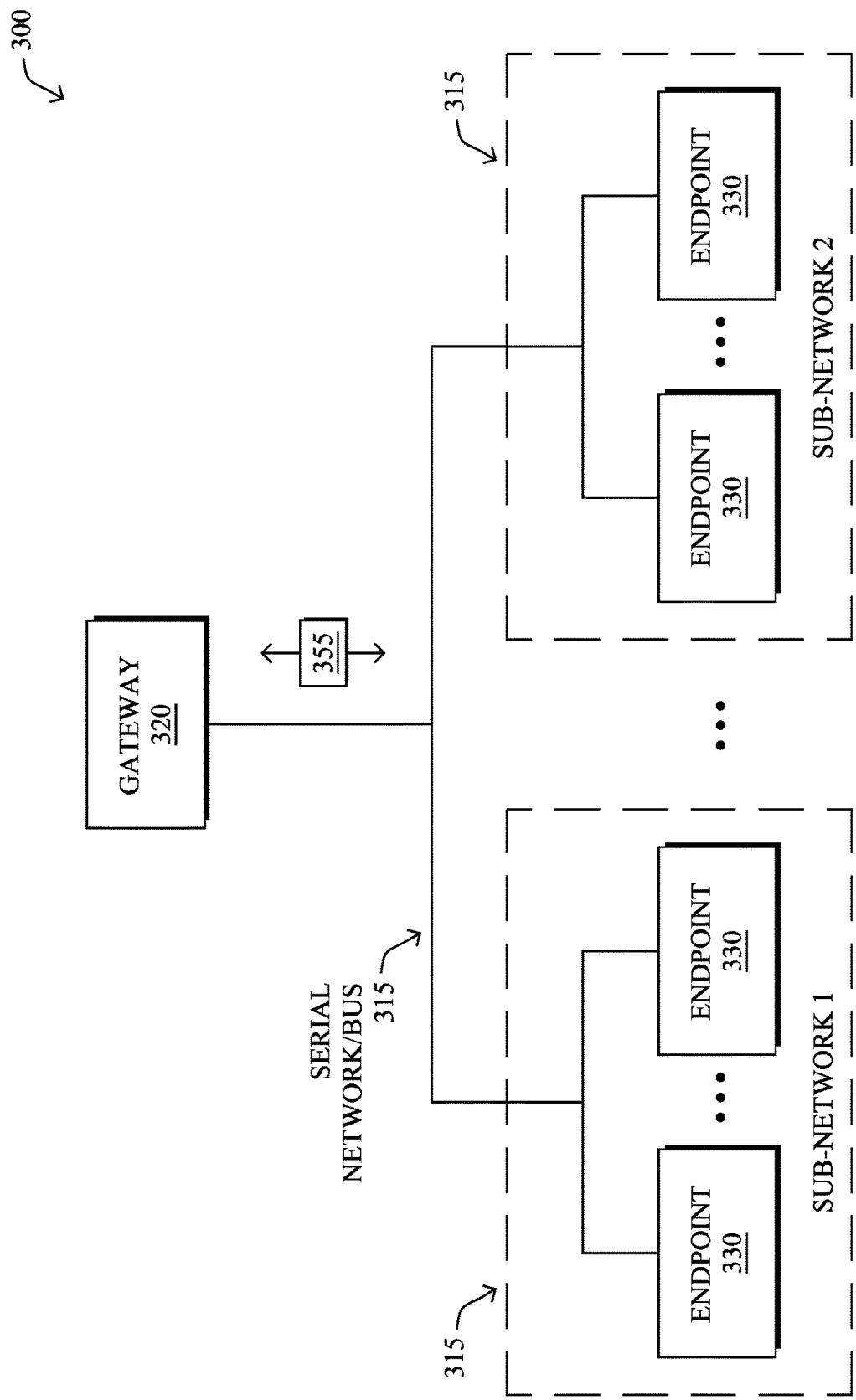

FIG. 3B illustrates one potential implementation of communication system 300, according to various embodiments. As shown, endpoints 330 may be organized into any number of sub-networks 325 of serial network/bus 315 (e.g., a first through nth sub-network). For example, in the case of a vehicle, the engine control system may be on one sub-network 325, the braking system (e.g., an anti-lock braking system, etc.) may be on another sub-network 325, etc. Each of sub-networks 325 may also provide different levels of performance, in some cases. For example, system critical components may be on a 500 kbps sub-network, whereas non-critical components may be on a 250 kbps sub-network. Interconnecting sub-networks 325 may be gateway 320 and/or any number of gateways that interconnect different sub-networks 325.

As noted above, the amount and type of data collected by cloud-based services and data centers from edge devices such as passenger and commercial vehicles has been increasing significantly. However, many existing gateways are not able to support the amount of additional data produced by these vehicles. For example, most vehicles today have several on-board electronic control units (ECUs) that collect vehicle data, which can be extremely useful in early detection of impending problems. These components, often intended for electric charging and autonomous features, may produce significant amounts of data to be collected.

For security and safety purposes, alerting vehicle manufacturers and operators of potential problems in advance is crucial to avoiding expensive repairs or irreparable damage. A periodic and simple diagnostic can mitigate unwanted problems. However, current qualitative/quantitative periodic diagnostic systems typically lack the following:
1. An ability for thorough data collection
2. An ability to perform extensive analysis
3. The existence of built-in intelligence to correlate multiple subsystems to infer complex failures
4. An ability to report/display information beyond a "check engine" light Vehicle manufacturers and original equipment manufacturers (OEMs) would benefit from a mechanism to collect data from their vehicles as well, particularly for correlation with their repair databases. An analysis of the large data sets could also be used to infer any systemic problems that can cause expensive recalls and damage brand reputation. However, current communication systems, such 3G/LTE/5G, would be insufficient for operating from fast ground based stations for cost efficiency and security.

Interfacing a Vehicle with a Fog Device During Fueling

The techniques herein provide a fast and efficient solution to interfacing with a vehicle to obtain data from various on-board diagnostic systems. Since on-board ECUs and subsystems have limited storage and computational capacity, various embodiments of the present disclosure provide for direct connectivity to a station or kiosk specifically configured for data uploading, particularly while also providing energy to the vehicle (e.g., stored energy in the form of a liquid fuel or charge from a battery or capacitor, from the power grid, etc.). Data computation and analysis may be performed in a distributed manner across various edge devices (e.g., fog nodes) in a network to be provided, for example, to the vehicle manufacturer.

Specifically, according to one or more embodiments of the disclosure as described in detail below, a fog computing-based fueling kiosk forms a fueling connection with a vehicle and a direct network connection between the kiosk and a gateway for a network of the vehicle. The fueling kiosk provides energy to the vehicle via the fueling connection and receives, via the network connection with the gateway for the network of the vehicle, operational data from the network of the vehicle, while providing the energy to the vehicle via the fueling connection. The fueling kiosk performs an analysis of the received operational data from the vehicle and provides a result of the performed analysis to a remote device.

Illustratively, the techniques described herein may be performed by hardware, software, and/or firmware, such as in accordance with the vehicle interfacing process 248, which may include computer executable instructions executed by the processor 220 (or independent processor of interfaces 210) to perform functions relating to the techniques described herein, e.g., in conjunction with routing process 244.

Operationally, FIGS. 4-7 illustrate example systems for interfacing with a vehicle during fueling, according to various embodiments. Generally, as shown, a kiosk 430 may form both a fueling connection and a network connection with a vehicle 410. In this way, kiosk 430 may be configured to provide energy to vehicle 410 via the fueling connection and may further be configured to receive diagnostic/operational data from the vehicle via the direct network connection. As used herein, the term 'kiosk' refers generally to any station or endpoint that provides energy to a vehicle (e.g., via liquid or gaseous fuel, electrical charge, etc.). The type of energy may vary according to the vehicle type. For example, the kiosk may provide an electric charge to batteries of an EV or hybrid vehicle while liquid fuel may be provided to gas or hybrid cars, such as from a hose of a fuel pump station. Operational data may include, for example, data relating to the current status of the vehicle and/or systems as well as past status logs during the vehicle's regular operation.

In various embodiments, the network connection formed between kiosk 430 and vehicle 410 may be a direct connection (i.e., a connection having no intervening or intermediate networking devices between the vehicle and the kiosk). This is in contrast to systems that require communications between the two to traverse the networking devices of a cellular network. Examples of direct network connections include an Ethernet connection, a Wi-Fi connection, a Bluetooth connection, an IO-Link connection, or an On-Board Diagnostic (OBD) connection. In addition, the connection may be a CAN bus connection enabled to access data from various internal ECUs and subsystems of vehicle 410. In some embodiments, the direct network connection may be formed between the kiosk and a gateway or other device of the vehicle's serial network, described in more detail above.

Figure 4:
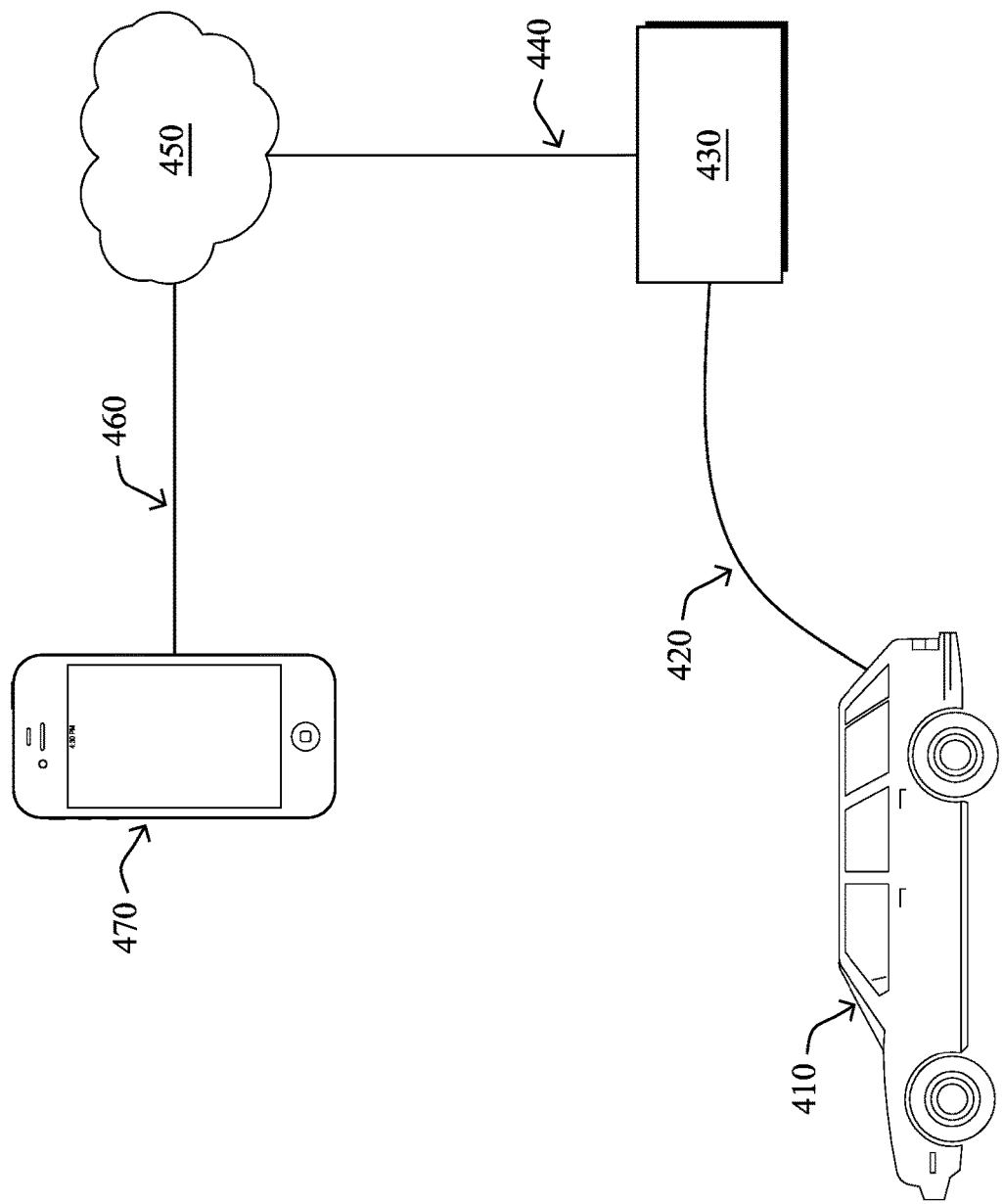
FIGS. 4-7 illustrate example vehicle interfacing during fueling.

The kiosk may receive the data from the vehicle via the network connection while providing the energy to the vehicle via the fueling connection. In particular, as shown in the embodiment of FIG. 4, vehicle 410 (e.g., an EV or hybrid) may be connected to kiosk 430 via power cable 420, which is configured to provide both power (e.g., energy) to charge the vehicle as well as to provide a direct network connection to receive data from the vehicle. Signal modulation techniques may be used to carry data over the same power line used for charging the vehicle. For example, the power cable already carrying power may be modified as needed in order to enable a modulated signal to be carried over the power lines. In further embodiments, power cable 420 may include separate cabling or conductors/wires for charging and communications (e.g., a power cable and an Ethernet cable, etc.).

The charging kiosk 430 may perform extensive computation and analysis on the operational data received from the vehicle. In particular, the processed data may be correlated by kiosk 430 in order to analyze and diagnose potential safety and/or performance related issues of vehicle 410. In some embodiments, the results of the diagnosis and analysis may be provided to a user, such as in the form of a report or summary. For example, as shown in FIG. 4, kiosk 430 may receive operational data from vehicle 410 via power cable 420 (e.g., the direct network connection) while charging the vehicle using the same cable. Kiosk 430 (e.g., a fog computing-based device) may also process and analyze the data and provide results that may be made available to a user device (e.g., smart phone 470) through network connection 440 and network 450 (e.g., a cloud service network, etc.). For example, kiosk 430 may compute a statistic (e.g., average, minimum, maximum, etc.) from a set of sensor readings from vehicle 410 and provide the computed statistic to the user via user device 470. A user, such as the vehicle owner/operator, a service/repair provider, or a manufacture, may access the results of the analysis, for example, by opening an application on device 470 in order to identify, authenticate and view the diagnosis report in real time, as well as have an ability to access it at other times.

Figure 5:
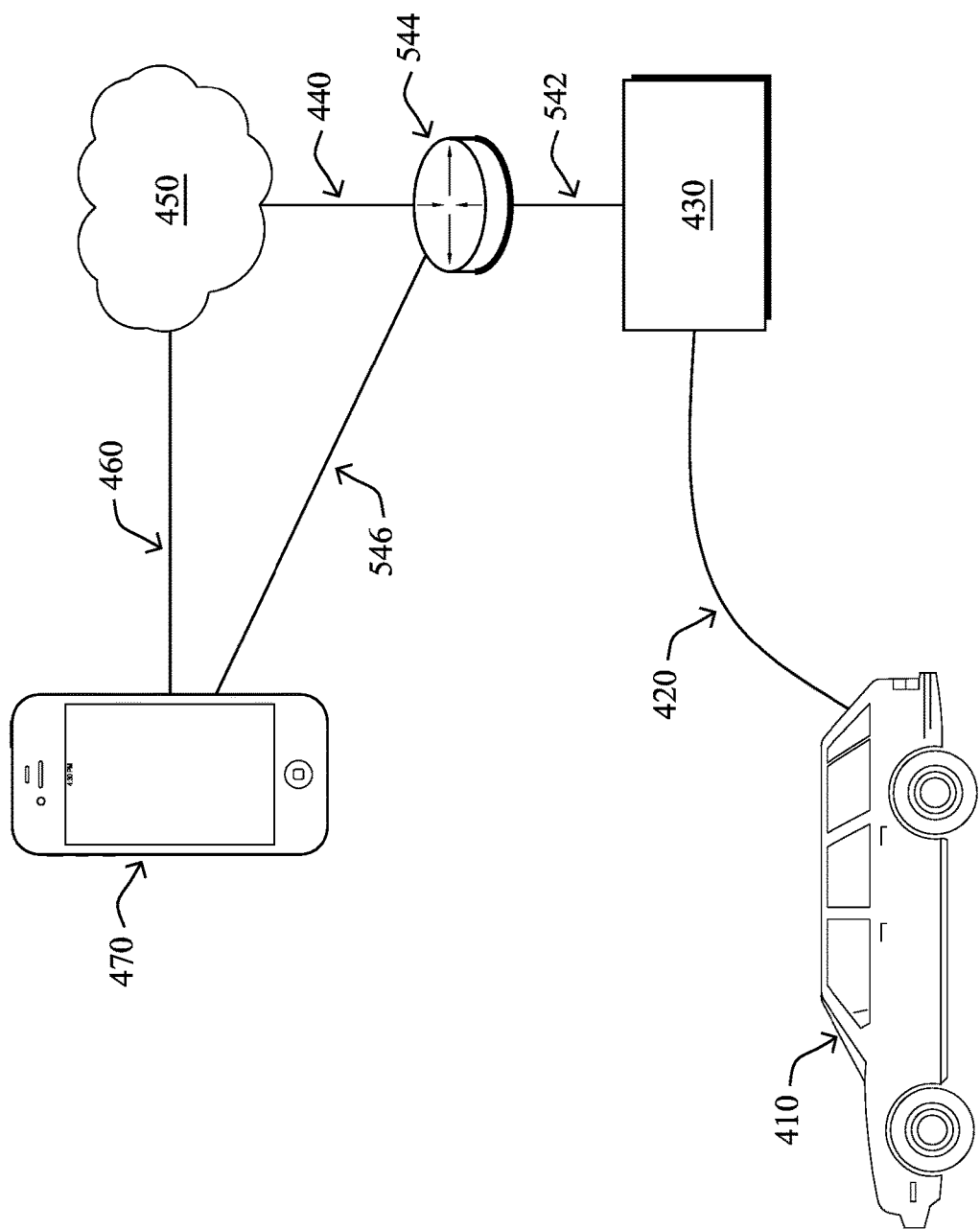

FIG. 5 illustrates another embodiment of the present disclosure in which a charging station/kiosk 430 is located near a home network of the user. As shown, kiosk 430 may form a power and data connection with vehicle 410 via power cable 420. In addition, the charging station/kiosk may also be configured to connect to networking device 544, which may be, e.g., a router in a local area network (LAN) (e.g., a home or SoHo LAN or WLAN). In this way, operational data received from the vehicle 410 may be received at user device 470 via device 544 through home network connections 542 and 546 or via network 450 (e.g., a cloud network). In some embodiments, the home network connections may be wireless depending on the type of home network available.

Figure 6:
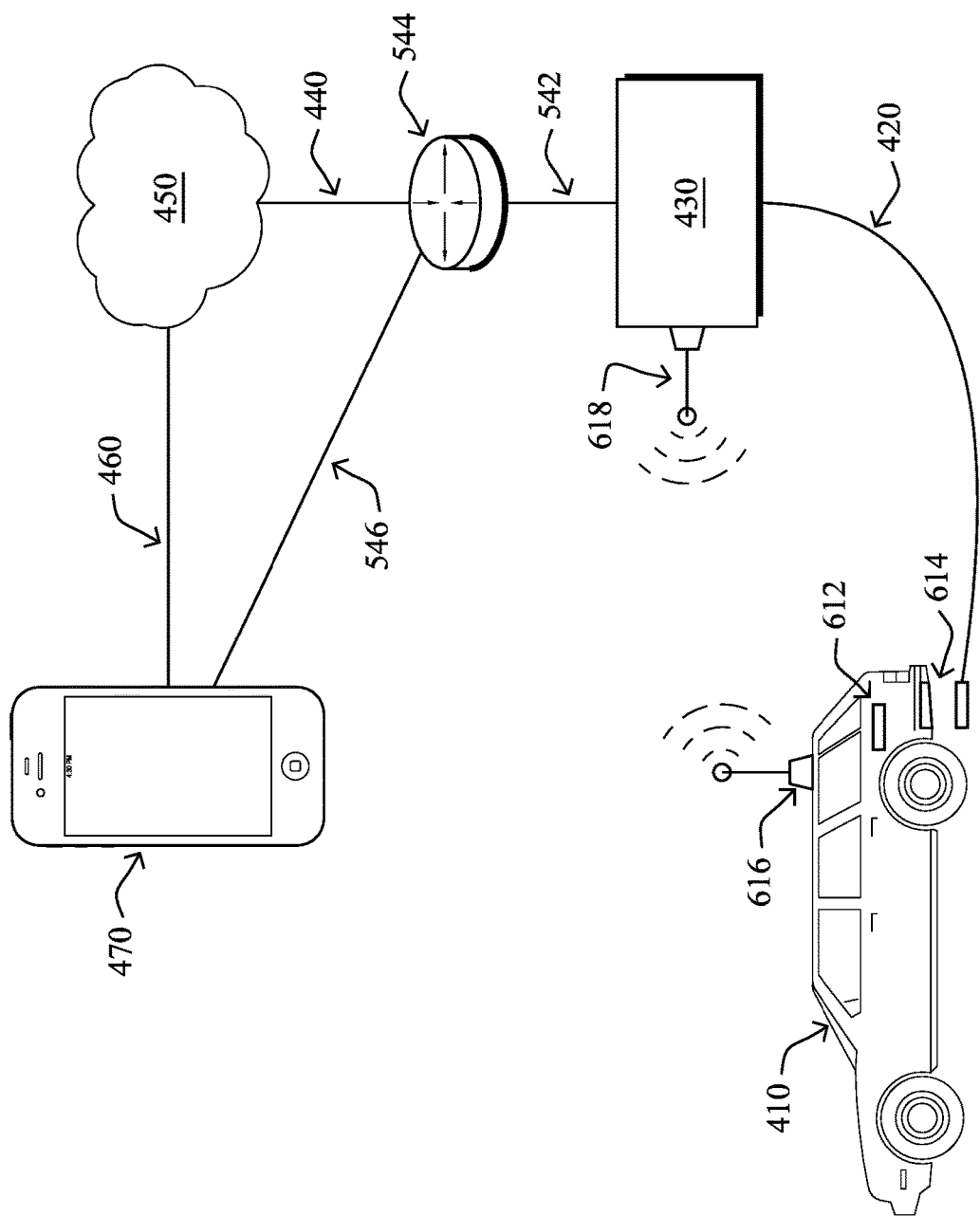

As noted above, the vehicle may be connected to the charging station/kiosk and may send data while receiving energy (e.g., charging for an EV or hybrid). Any method of charging may be used. For example, in one embodiment, vehicle 410 may be charged wirelessly using advanced communication techniques to connect to the vehicle side battery charging subsystems for control. Communication on the vehicle side may be extended in order to access other internal subsystems over the internal communication busses. As shown in FIG. 6, vehicle 410 may be charged wirelessly using induction charging system 614 and internal controls 612 via wireless transceivers 616 and 618 at the vehicle and kiosk 430 respectively. In some embodiments, charging system 414 may also be used to form the network connection between 430 and vehicle 410 (e.g., by modulating the signal of one or more coils of charging system 614). In this way, vehicle 410 may be charged wirelessly, while also providing data to the kiosk 430 over the wireless network connection. The communication medium between the vehicle and charger can be any form of wireless communication, such as a dedicated short range communication (DSRC), a Wi-Fi connection, or a Bluetooth connection.

Figure 7:
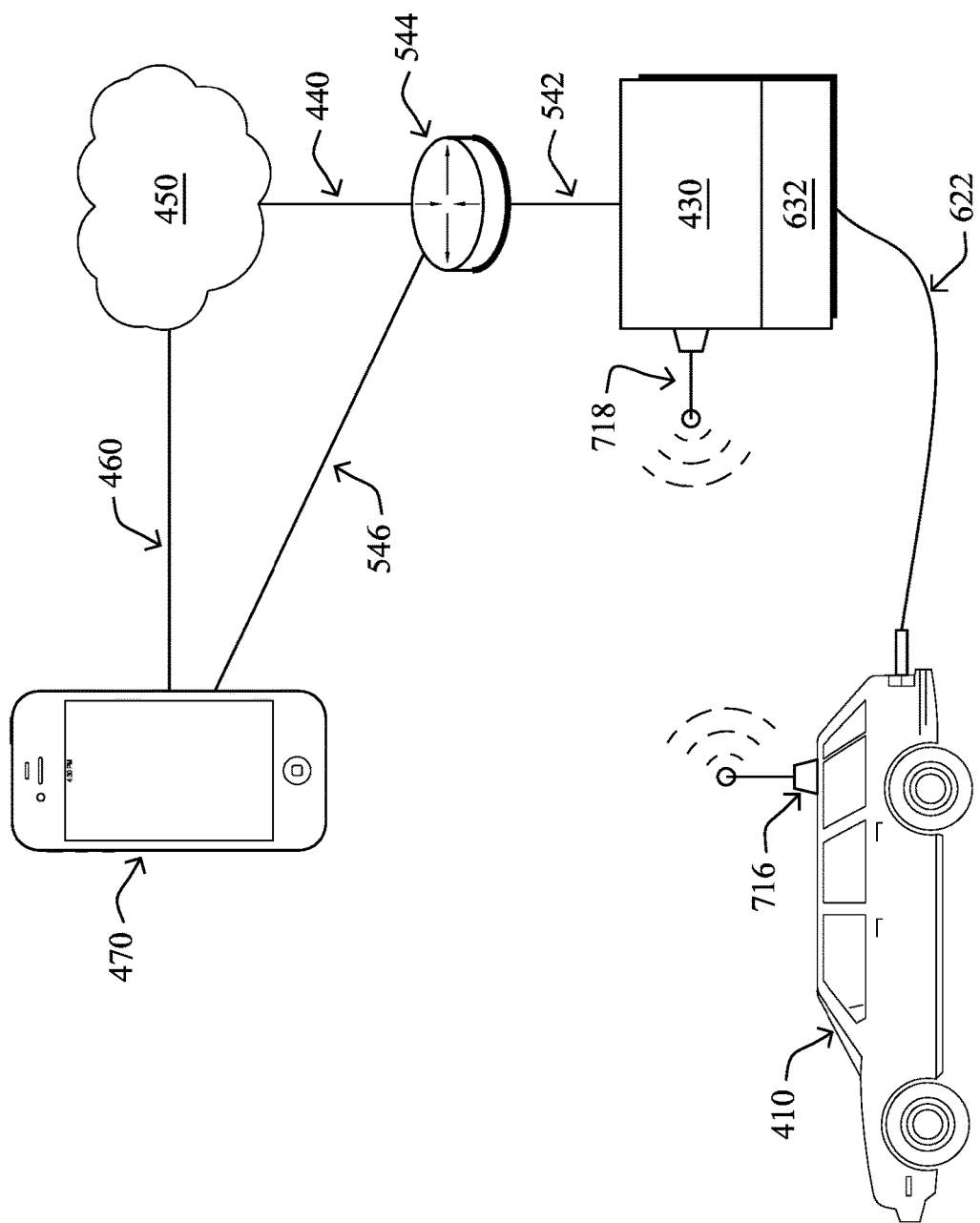

In some embodiments, the vehicle connected to the charging station/kiosk may even be a liquid or gas powered vehicle that requires the use of gasoline, hydrogen, or other chemical fuel. As shown in FIG. 7, vehicle 410 may be equipped to communicate with kiosk 430 via wireless communication device 716, which may be, for example, a small low power wireless adapter such as a Bluetooth dongle plugged into the OBD-II port of the vehicle 410, in one embodiment. Kiosk 430 may include corresponding wireless communication device 718. In addition, kiosk 430 may further include fuel pump 632 to provide liquid fuel to the vehicle, such as through hose 622. In this way, a gasoline or diesel powered vehicle may be connected to a filling station/kiosk and receive fuel while also providing data to the kiosk for processing and analysis.

It is to be appreciated that the above examples are not intended to be limiting, but provided herein solely for purposes of illustration. Notably, any of the fueling and communication techniques above can be mixed with one another, in further embodiments. For example, a further case may entail an electric or hybrid vehicle being charged using a physical charging cable while communicating with the kiosk using Wi-Fi or other direct wireless connection.

Figure 8:
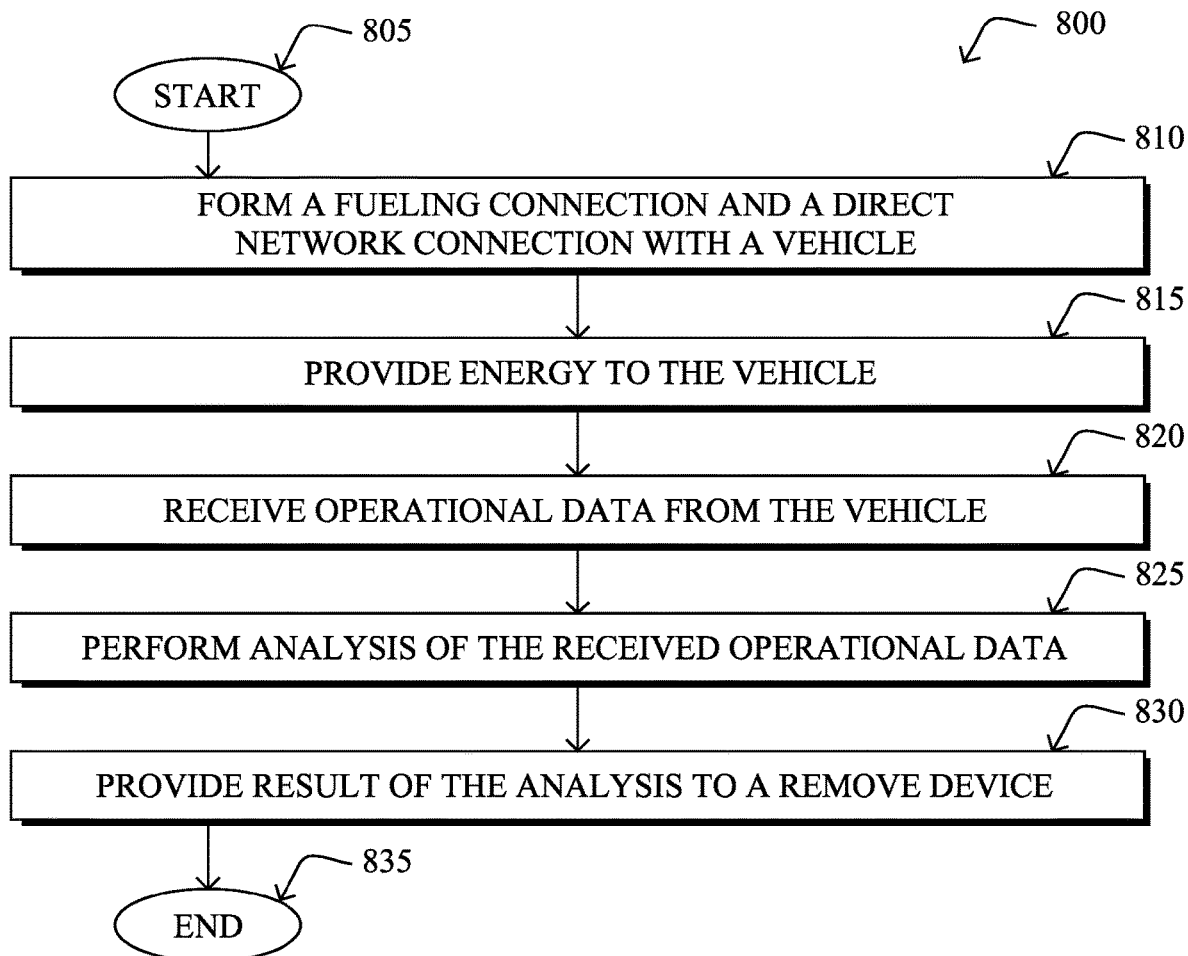
FIGS. 8-9 illustrate simplified procedures for interfacing a vehicle during fueling.
Figure 9:
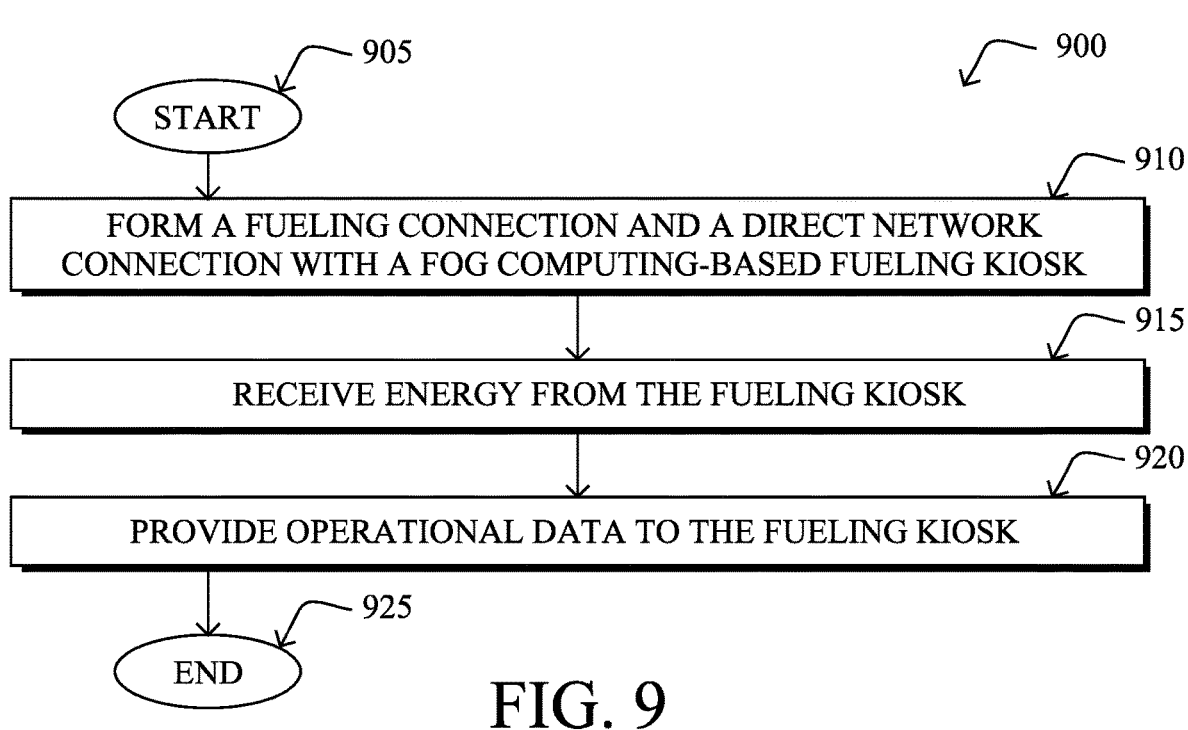

FIG. 8 and FIG. 9 illustrate example simplified procedures for interfacing with a vehicle in a network, in accordance with one or more embodiments of the techniques described herein. For example, a non-generic, specifically configured device (e.g., device 200) may perform procedures 800 and/or procedure 900 by executing stored instructions (e.g., process 248).

In particular, procedure 800 may start at step 805 and continue to step 810, where, as described in greater detail above, a charging station/kiosk (e.g., a fog computer-based fueling kiosk) forms a fueling connection and a direct network connection with a vehicle. The network connection, which may include an Ethernet, Wi-Fi, Bluetooth, IO-Link, or On-Board Diagnostic (OBD) connection, is direct between the vehicle and kiosk, having no intermediate devices between them. For example, the connection may be a CAN bus connection between a gateway or other device of the vehicle's serial network and the kiosk.

In step 815, the charging station/kiosk may provide energy to the vehicle via the fueling connection. As described in greater detail above, the energy may be in the form of liquid fuel (e.g., gasoline or diesel) or may be an electric charge, depending on the vehicle type. The fueling connection may be a pump hose (for dispensing liquid fuel) or a power cable (for EVs or hybrids).

In step 820, the charging station/kiosk may receive operational data from the vehicle via the direct network connection. As described in greater detail above, operational data may be information pertaining to the current status of the vehicle or its systems. Past records relating to previous operations of the vehicle may also be included. In some embodiments, the kiosk receives the data while providing the energy to the vehicle. For example, the direct network connection may convey data between the kiosk and the vehicle by modulating an electric charge provided to the vehicle, such as over a power cable.

In step 825, the charging station/kiosk may perform an analysis of the received operational data from the vehicle. In particular, the data may be processed and correlated by the kiosk (e.g., a fog computing-based device) in order to diagnose potential safety and/or performance issues, as described in greater detail above. For example, the data may be correlated with manufacturer recommended information or with past repair databases in order to predict or recommend pending service needs.

In step 830, the charging station/kiosk may provide a result of the performed analysis to a remote device. For example, data received from the vehicle may be processed and analyzed, and the results may be made available to a user for review. As described in greater detail above, the results may be provided from the kiosk to a cloud network accessible from a user device, such as via an application on a smartphone. Procedure 800 may then end at step 835.

Procedure 900 may start at step 905 and continue to step 910 where, as described in greater detail above, a vehicle may form a fueling connection and a direct network connection with a fog computing-based fueling kiosk. As describe in greater detail above, the vehicle may have a serial network, and the direct network connection may connect the serial network of the vehicle with the kiosk via a gateway of the vehicle.

In step 915, the vehicle may receive energy from the fueling kiosk via the fueling connection. For example, the batteries of the vehicle may receive an electrical charge or liquid fuel, as need and described in greater detail above.

In step 920, the vehicle may provide operational data to the kiosk. The data may be provided via the direct network connection from the serial network of the vehicle directly to the kiosk. In some embodiments, the operational data may be provided while the vehicle is receiving the energy from the kiosk via the fueling connection. The kiosk may perform an analysis of the operational data and provides a result of the analysis to a remote device, as described in greater detail above. Procedure 900 may then end at step 925.

It should be noted that while certain steps within procedures 800 and 900 may be optional as described above, the steps shown in FIG. 8 and FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, may provide fueling and network interfacing with a vehicle. In particular, data access is enable across various vehicle subsystems while the vehicle is fueling/charging. Since on-board ECUs and subsystems have a limited storage and computational capacity, mainly driven by cost considerations, an infrastructure is provided for off-loading of data for analysis and processing. In particular, the charging station/kiosk and its connection to a cloud network may act as infinite storage as well as provide significant computing power, enabling deep data analysis. The kiosk may also provide an edge entity (e.g., a fog computing-based device) enabled to identify, authenticate, and allow secure access to the vehicular network as well as to filter and separate data into anonymous generic vehicle data (make and model level data) and user specific vehicle data. The anonymous data may be used by vehicle manufacturers to identify systemic problems early on to prevent expensive recalls and brand reputation damages. The user specific data may be retained for extensive vehicle history analysis specific to a given vehicle.

While there have been shown and described illustrative embodiments that provide for interfacing with a vehicle, it is to be understood that various other adaptations and modifications may be made within the spirit and scope of the embodiments herein. For example, while certain embodiments are described herein with respect to using certain types of vehicle and connections thereto, the techniques are not limited as such and may be used for other types of vehicles, in other embodiments. For example, the techniques herein could also be applied to other forms of vehicle networks, such as Flexray, LIN, MOST, Ethernet, or any other form of known vehicle network. In addition, while certain protocols are shown, such as Wi-Fi and Bluetooth, other suitable protocols may be used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    forming, by a fog computing-based fueling kiosk, a physical connection with a vehicle, the physical connection comprising a fueling connection between the fueling kiosk and the vehicle and a direct network connection between the fueling kiosk and a gateway for a network of the vehicle;
    providing, by the fueling kiosk, energy to the vehicle via the fueling connection;
    receiving, at the fueling kiosk and via the network connection with the gateway for the network of the vehicle, operational data from the network of the vehicle, while providing the energy to the vehicle via the fueling connection;
    performing, by the fueling kiosk, an analysis of the received operational data from the vehicle; and
    providing, by the fueling kiosk, a result of the performed analysis to a remote device.

2. The method as in claim 1, wherein providing the energy to the vehicle via the fueling connection comprises:
    providing, by the fueling kiosk, liquid fuel to the vehicle via the fueling connection, wherein the fueling connection comprises a hose.

3. The method as in claim 1, wherein providing the energy to the vehicle via the fueling connection comprises:
    providing, by the fueling kiosk, electrical charge to one or more batteries of the vehicle via the fueling connection.

4. The method as in claim 3, wherein the direct network connection conveys data between the fueling kiosk and the vehicle by modulating the electrical charge.

5. The method as in claim 4, wherein the fueling connection comprises a power cable, and wherein the network connection modulates an electrical signal in the power cable.

6. The method as in claim 1, wherein the direct network connection comprises at least one of: an Ethernet connection, a Wi-Fi connection, a Bluetooth connection, an IO-Link connection, or an On-Board Diagnostic (OBD) connection.

7. The method as in claim 1, wherein providing the result of the performed analysis to the remote device comprises:
provurn, by the fueling kiosk, the result of the performed analysis to a mobile device associated with the vehicle.

8. The method as in claim 1, wherein providing the result of the performed analysis to the remote device comprises:
providing, by the fueling kiosk, the result of the performed analysis to a cloud-based server.

9. The method as in claim 1, wherein forming the direct network connection comprises:
communicating, by the fueling kiosk, with a removable dongle plugged into the vehicle.

10. A method, comprising:
forming, by a vehicle having a network, a physical connection with a fog computing-based fueling kiosk, the physical connection comprising a fueling connection between the vehicle and the fueling kiosk and a direct network connection between the vehicle and the fueling kiosk, wherein the direct network connection connects the network of the vehicle with the fueling kiosk via a gateway of the vehicle;
receiving, at the vehicle, energy from the fueling kiosk via the fueling connection; and
uploading, by the vehicle and via the network connection, operational data from the network of the vehicle, while receiving the energy from the kiosk via the fueling connection, wherein the kiosk performs an analysis of the operational data and provides a result of the analysis to a remote device.

11. The method as in claim 10, wherein receiving the energy via the fueling connection comprises:
receiving, from the fueling kiosk, liquid fuel via the fueling connection, wherein the fueling connection comprises a hose.

12. The method as in claim 10, wherein receiving the energy via the fueling connection comprises:
receiving, from the fueling kiosk, electrical charge for one or more batteries of the vehicle via the fueling connection.

13. The method as in claim 12, wherein the direct network connection conveys data between the fueling kiosk and the vehicle by modulating the electrical charge.

14. The method as in claim 13, wherein the direct network connection comprises a power cable, and wherein the network connection modulates an electrical signal in the power cable.

15. The method as in claim 10, wherein the direct network connection comprises at least one of: an Ethernet connection, a Wi-Fi connection, a Bluetooth connection, an IO-Link connection, or an On-Board Diagnostic (OBD) connection.

16. A fueling kiosk comprising:
a fueling mechanism configured to form a physical connection with a vehicle, the physical connection comprising a fueling connection that provides energy to the vehicle via the fueling connection; and
a processing circuit comprising:
one or more network interfaces to communicate with a network;
a processor coupled to the network interfaces and configured to execute one or more processes; and
a memory configured to store a process executable by the processor, the process when executed configured to:
form, using the physical connection, a direct network connection between the fueling kiosk and a gateway for a network of the vehicle;
receive, via the direct connection with the gateway for the network of the vehicle, operational data from the network of the vehicle, while providing the energy to the vehicle via the fueling connection;
perform an analysis of the received operational data from the vehicle; and
provide a result of the performed analysis to a remote device.

17. The fueling kiosk as in claim 16, wherein the fueling mechanism comprises a hose that provides liquid fuel to the vehicle.

18. The fueling kiosk as in claim 16, wherein the fueling mechanism comprises one or more coils that wirelessly provide charge to one or more batteries of the vehicle.

19. The fueling kiosk as in claim 16, wherein the fueling mechanism comprises a power cable, and wherein the network connection modulates an electrical signal in the power cable.

20. The fueling kiosk as in claim 16, wherein the direct network connection comprises at least one of: an Ethernet connection, a Wi-Fi connection, a Bluetooth connection, an IO-Link connection, or an On-Board Diagnostic (OBD) connection.

* * * * *